(12) United States Patent
Bae et al.

(10) Patent No.: US 9,252,875 B2
(45) Date of Patent: Feb. 2, 2016

(54) APPARATUS AND METHOD FOR ALIGNING VISIBLE LIGHT COMMUNICATION DEVICES IN VISIBLE LIGHT COMMUNICATION SYSTEM

(75) Inventors: Tae-Han Bae, Seoul (KR); Jae-Seung Son, Gyeonggi-do (KR); Eun-Tae Won, Seoul (KR)

(73) Assignee: Samsung Electronics Co., Ltd (KR)

( * ) Notice: Subject to any disclaimer, the term of this patent is extended or adjusted under 35 U.S.C. 154(b) by 397 days.

(21) Appl. No.: 13/995,779

(22) PCT Filed: Dec. 20, 2011

(86) PCT No.: PCT/KR2011/009847
§ 371 (c)(1),
(2), (4) Date: Jun. 19, 2013

(87) PCT Pub. No.: WO2012/086999
PCT Pub. Date: Jun. 28, 2012

(65) Prior Publication Data
US 2013/0266327 A1   Oct. 10, 2013

(30) Foreign Application Priority Data
Dec. 20, 2010   (KR) .................. 10-2010-0130578

(51) Int. Cl.
G06K 9/40    (2006.01)
H04B 10/112  (2013.01)
H04B 10/116  (2013.01)

(52) U.S. Cl.
CPC ............ *H04B 10/112* (2013.01); *H04B 10/116* (2013.01)

(58) Field of Classification Search
CPC ............. H04B 10/112; H04N 7/26888; H04N 1/4097; G06T 5/001; G06T 5/20
See application file for complete search history.

(56) References Cited

U.S. PATENT DOCUMENTS

| | | | |
|---|---|---|---|
| 6,498,668 B1 | 12/2002 | Korevaar | |
| 6,769,792 B1 * | 8/2004 | Bornhorst | F21S 10/007 348/E5.141 |
| 7,088,335 B2 * | 8/2006 | Hunter | G02F 1/133617 345/102 |
| 7,432,917 B2 * | 10/2008 | Wilson | G06F 3/0418 345/173 |
| 7,681,453 B2 * | 3/2010 | Turner | G01N 21/1717 356/502 |
| 8,386,951 B2 * | 2/2013 | Tallman | G06F 3/04847 250/339.04 |
| 8,556,430 B2 * | 10/2013 | Hajjar | G01J 3/506 250/348 |

(Continued)

FOREIGN PATENT DOCUMENTS

| | | |
|---|---|---|
| KR | 1020090005520 | 1/2009 |
| KR | 1020100026773 | 3/2010 |
| KR | 1020100064155 | 6/2010 |

OTHER PUBLICATIONS

PCT/ISA/237 Written Opinion issued on PCT/KR2011/009847 (pp. 4).

(Continued)

*Primary Examiner* — Amir Alavi
(74) *Attorney, Agent, or Firm* — The Farrell Law Firm, P.C.

(57) ABSTRACT

A method for aligning among visible light communication devices comprises the following steps: generating a visible light signal and transmitting same to a corresponding device; determining whether the visible light signal that is output via the screen of the device is identifiable; correcting the color of the visible light signal that is output on the screen if the visible light signal is not identifiable; and using the visible light signal that is corrected to perform alignment for visible light communicating with the corresponding device.

12 Claims, 7 Drawing Sheets

(56) References Cited

U.S. PATENT DOCUMENTS

| | | | |
|---|---|---|---|
| 8,836,778 B2 * | 9/2014 | Ignatovich | A61B 3/1208 |
| | | | 348/77 |
| 2007/0223929 A1 | 9/2007 | Graves | |
| 2009/0196622 A1 | 8/2009 | Shin et al. | |
| 2010/0054755 A1 | 3/2010 | Kwon et al. | |
| 2013/0083082 A1 * | 4/2013 | Bukesov | C09K 11/7734 |
| | | | 345/690 |
| 2013/0266327 A1 * | 10/2013 | Bae | H04B 10/112 |
| | | | 398/131 |
| 2014/0062863 A1 * | 3/2014 | Yu | G06F 3/0418 |
| | | | 345/156 |

OTHER PUBLICATIONS

PCT/ISA/210 Search Report issued on PCT/KR2011/009847 (pp. 3).

* cited by examiner

APPARATUS AND METHOD FOR ALIGNING VISIBLE LIGHT COMMUNICATION DEVICES IN VISIBLE LIGHT COMMUNICATION SYSTEM

PRIORITY

The present application claims priority under 35 U.S.C. §365 to International Patent Application No. PCT/KR2011/009847 filed Dec. 20, 2011, and under 35 U.S.C. §119(a) to Korean Patent Application No. 10-2010-0130578 filed Dec. 20, 2010, which are incorporated herein by reference.

BACKGROUND OF THE INVENTION

1. Field of the Invention

The present invention relates to visible light communication, and more particularly, to an apparatus and a method for aligning visible light communication devices by using a camera and a screen mounted to a mobile terminal.

2. Description of the Related Art

In general, visible light communication refers to a wireless communication technology using light in a visible wavelength range, and in recent years, studies on the visible light communication have been increasingly conducted along with proliferation of a light emitting diode (LED). Recently, the visible light communication mainly using the LED as a light source for communication has been more spotlighted due to lack of frequencies in a radio frequency (RF) band, a possibility of cross talk between various wireless communication technologies, and an increased demand for communication security.

In the general visible light communication, a transmitter emits visible light by using the LED or a laser diode (LD) as the light source, and a receiver processes the visible light by using a photo diode (PD). As light emission efficiency of the LED is improved and a price of the LED is lowered, the LED is becoming more common in a market of general lighting such as fluorescent lamps and in a market of special lighting employed in portable devices, displays, vehicles, traffic signals, and advertising boards.

Figure 1:
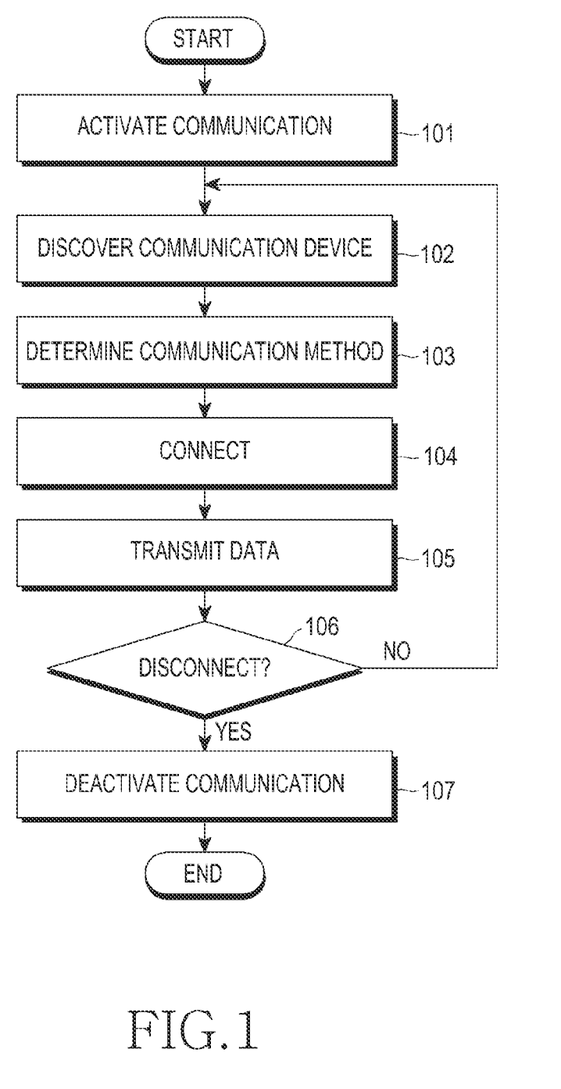
FIG. 1 is a flowchart showing processes of performing data transmission by using existing infrared-ray.

Infrared-ray communication may be given as an example of technology with a similar characteristic to the visible light communication. FIG. 1 is a flowchart showing a conventional process of performing data transmission by using infrared-ray.

Referring to FIG. 1, a wireless communication process using the infrared-ray includes an infrared-ray communication activation step 101, an external infrared-ray communication device discovery step 102, a communication method determination step 103, a connection step 104, a data transmission step 105, a disconnection determination step 106, and a communication deactivation step 107. A user approximately orients the infrared-ray communication device to align communication links through such a series of steps as described above.

Figure 2:
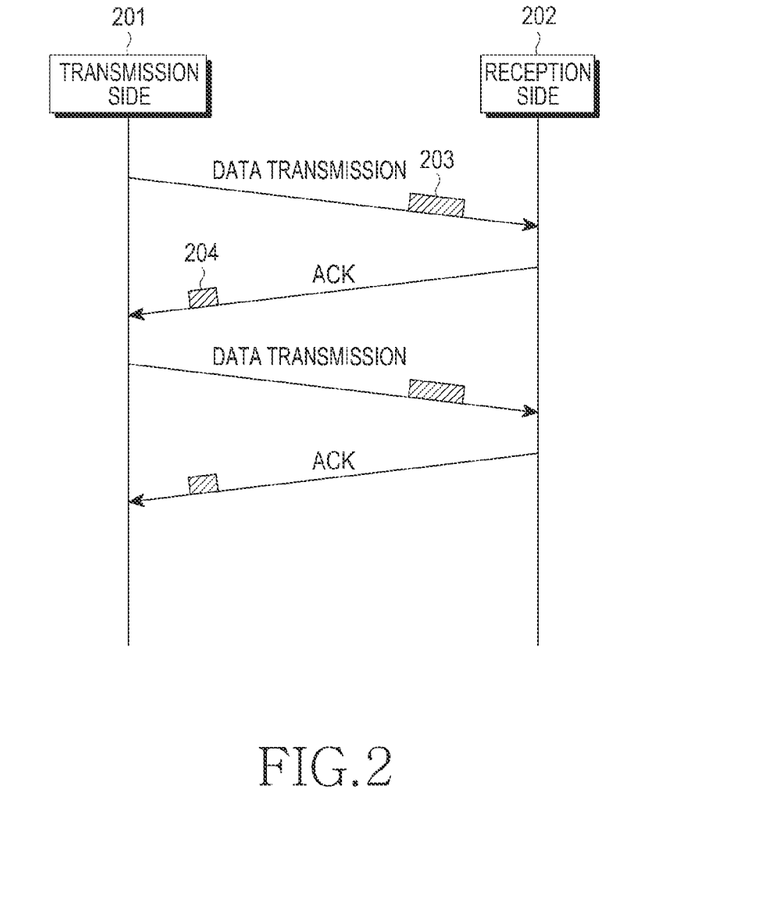
FIG. 2 is a signal flow diagram showing a data transmission method using the existing infrared-ray.

A data transmission method between a transmission side and a reception side which perform the infrared-ray communication will be described hereinafter. FIG. 2 is a signal flow diagram showing an example of a data transmission method using the existing infrared-ray.

Referring to FIG. 2, if a transmission side 201 transmits data to a reception side 202 in step 203, the reception side 202 transmits an acknowledge (ACK) signal for acknowledging the receipt of the received data to the transmission side 201 in step 204. In this way, the data transmission is performed between the transmission side 201 and the reception side 202.

The above-described method using the infrared-ray may be similar to a method using the visible light in that they use the LED, except for the difference in the band in which the light source is used. In other words, it can be said that the biggest difference between the infrared-ray communication and the visible light communication is visibility, and in this regard, the visible light communication which is currently being developed has a distinctive feature as compared with the infrared-ray communication. That is, the biggest feature of the visible light communication in comparison with the infrared-ray communication is that the visible light communication uses a light source in a visible light band, which enables the user to directly identify the link situation of communication.

A frame, referred to as a visibility frame, which is not real data and is arranged to be shown to the user, may be intentionally transmitted to maximize an advantage of the visibility. The visibility frame may be used for informing of states of peripheral device discovery, connection, and data transmission in a process occurring when the communication is performed, or for orienting one communication device toward a counterpart device in order to align the communication devices with each other before the communication between the communication devices. In this event, due to straightness of the light source used in the visible light communication, it is of great importance to align the communication devices with each other during the communication between the communication devices.

That is, as in the visible light communication, in a case where the straightness of a communication medium is strong and a line of sight (LOS) is important, the alignment between the communication devices is significantly important. Further, when the user desires to align the communication links, the visibility may help the user a lot.

However, as the distance between two devices attempting to communicate with each other increases, the visibility is deteriorated. This problem may be solved if the brightness of the light source is increased by increasing the power of a transmitted signal. However, such a power increase naturally causes incidental increase of power consumption. Further, an increase in the power of the signal may cause the devices themselves to generate heat. Moreover, the brightness of the light source may be increased so much that the light source may act as an obstruction to other peripheral devices or the user.

SUMMARY OF THE INVENTION

Therefore, the present invention has been made in view of the above-mentioned problems, and the present invention provides an apparatus and a method which accurately perform communication link alignment by using a camera and a screen mounted to the devices in a visible light communication system, when a visible light signal grows weak due to an increase in a distance between devices such that a user has trouble in identification.

Accordingly, an aspect of the present invention is to solve at least the above-described problems occurring in the prior art, and to provide at least the advantages described below.

In accordance with an aspect of the present invention, a method for alignment between visible light communication devices includes: generating a visible light signal and transmitting the visible light signal to a counterpart device by a device; determining whether or not the visible light signal output through a screen of the device is identifiable; calibrating a color of the visible light signal output on the screen when the visible light signal is not identifiable; and performing alignment for visible light communication with the counterpart device by using the calibrated visible light signal.

In accordance with another aspect of the present invention, an apparatus for aligning visible light communication devices includes: a camera unit to which an image including a visible light signal is input; an input/output unit which outputs the image input from the camera unit on a screen, and to which a user input is input; an image processor which calibrates a color of the visible light signal included in the image when the user input is received: a visible light communication transmitter/receiver which transmits visible light communication including the visible light signal to a counterpart device, and receives the visible light communication including the visible light signal from the counterpart device; and a controller which determines whether or not the visible light signal included in the image displayed on the screen is identifiable, controls the image processor to calibrate the color of the visible light signal output on the screen when the visible light signal is not identifiable, and performs a control to align the apparatus with the counterpart device for the visible light communication, by using the calibrated visible light signal.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention will be described with reference to the accompanying drawings. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

The present invention proposes a method for making a received visible light signal more clearly shown, by using a camera and a screen mounted to a visible light communication device in a visible light communication system. To this end, a method according to the present invention includes: directly adjusting a direction of the device through a camera mounted to the visible light communication device; and controlling a color of the visible light signal displayed on a screen to be made clearly shown to eyes of a user.

Figure 3:
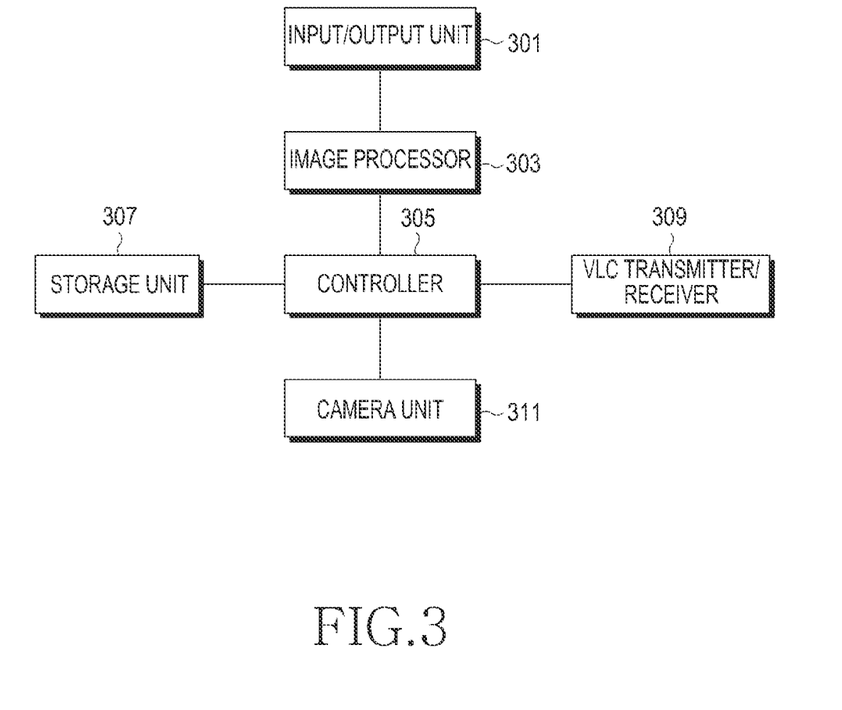
FIG. 3 is a block diagram showing an internal structure of a visible light communication device according to an embodiment of the present invention.

Hereinafter, a structure and an operation of the visible light communication device in the visible light communication system where the above-described functions are realized will be described with reference to FIG. 3. FIG. 3 is a block diagram showing an internal structure of a visible light communication device according to an embodiment of the present invention. The visible light communication device shown in FIG. 3 includes an input/output unit 301, an image processor 303, a controller 305, a storage unit 307, a visible light communication (VLC) transmitter/receiver 309, and a camera unit 311.

Referring to FIG. 3, the input/output unit 301 serves to receive a user input, and output a predetermined image on the screen. In the present invention, the predetermined image refers to an image representing a visible light communication receiver of a counterpart visible light communication device. That is, the input/output unit 301 receives the user input through the screen such as a touch screen, and outputs the predetermined image through the touch screen. The predetermined image may correspond to either an image stored in advance or an image received through the camera unit 311. Moreover, although the input/output unit 310 is shown as one element in FIG. 3, the input/out unit 310 may be divided into an input unit with a physical keypad and an output unit with an LCD panel. Further, when visible light communication is started, the input/output unit 301 separately outputs an image such as a grid or a target to accurately transmit the visible light signal to the counterpart visible light communication device.

The camera unit 311 functions to transmit the received image to the image processor 303, and is mounted to the visible light communication device such that a direction in which the camera unit 311 orients coincides with a direction in which the visible light communication orients. Since the camera unit 311 is mounted to orient in the same direction as the visible light communication orients in, it can be easily determined whether or not the visible light signal is readily transmitted to the corresponding visible light communication device.

The image processor 303 serves to distinguish colors of the image which is input and received from the camera unit 311, and to calibrate a specific color in response to the user input. When the camera unit 311 receives an image including the visible light signal, the image processor 303 serves to distinguish colors of the visible light signal included in the received image. Further, when it is determined that the visible light signal included in the received image is weak, the image processor 303 serves to more darkly calibrate a specific portion of the color of the visible light signal. Moreover, the image processor 303 serves to compare the visible light signal with a predetermined threshold value, and then to display more darkly a color higher than or equal to the threshold value of the colors included in the visible light signal and display more lightly a color lower than or equal to the threshold value, on the screen. Further, the image processor 303 serves to create a predetermined circle by using chromaticity coordinates. Further, when a color corresponding to the predetermined circle is included in the received image irrespective of the visible light signal, the image processor 303 serves to calibrate whole portions in the predetermined circle to a color corresponding to the center of the predetermined circle or a preset color such that the visible light signal is processed to be displayed on the screen.

The VLC transmitter/receiver 309 serves to transmit a visible light communication signal including the visible light signal to the corresponding visible light communication device, and to receive the visible light communication signal from the corresponding visible light communication device. The direction in which the visible light communication orients has to coincide with the direction in which the camera unit 311 orients such that the camera unit 311 smoothly receives an image including the visible light communication signal. Accordingly, the VLC transmitter/receiver 309 has to be situated at a location adjacent to the camera unit 311, and a direction in which the VLC transmitter/receiver 309 orients has to coincide with the direction in which the camera unit 311 orients.

The storage unit 307 serves to store a variable such as the threshold value designated in advance by the user, and transmits information of the saved variable to the controller 305 on receiving a request from the controller 305.

When the visible light communication signal including the visible light signal is received through the VLC transmitter/receiver 309, the controller 305 serves to control the camera unit 311 such that the image including the visible light signal is received from the camera unit 311, and to determine intensity of the visible light signal included in the received image. When it is determined that the intensity of the visible light signal is weak, the controller 305 controls the image processor 303 such that the color of the visible light signal is readily shown on the screen of the input/output unit 310. The user can easily determine whether or not the visible light communication device accurately aligns with the corresponding visible light communication device, while seeing the visible light signal, which is calibrated and output on the screen, with eyes.

FIGS. 4A to 4D illustrate an example of a process for alignment between the visible light communication devices using a camera according to an embodiment of the present invention.

Figure 4A:
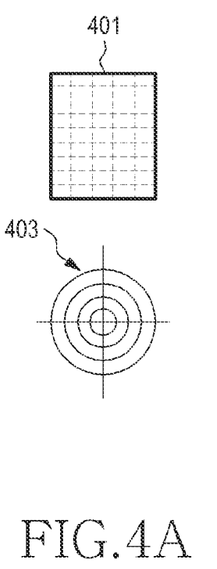
FIGS. 4A to 4D illustrate an example of a process for alignment between the visible light communication devices using a camera according to an embodiment of the present invention.

FIG. 4A shows a grid line 401 and a target 403 displayed on the screen of the visible light communication device. When the visible light communication between the visible light communication device and the corresponding visible light communication device is attempted at the very first, the grid line 401 and the target 403 are displayed on the screen of the visible light communication device. The target 403 corresponds to a target point toward which the visible light signal orients, and the visible light signal is generated in a direction of the target 403. The user sets the target 403 to a point corresponding to the VLC transmitter/receiver of the corresponding visible light communication device such that the visible light communication including the visible light signal can be comparatively accurately transmitted.

Figure 4B:
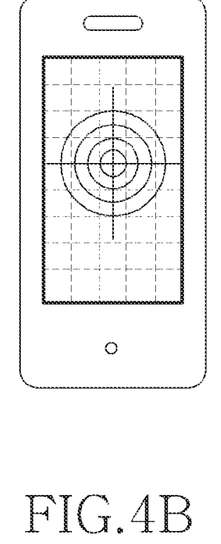
Figure 4C:
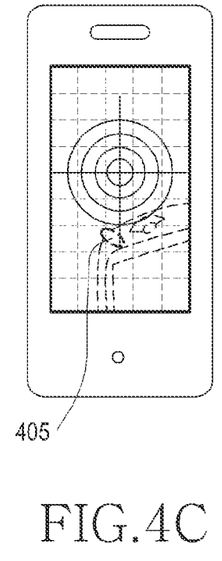
Figure 4D:
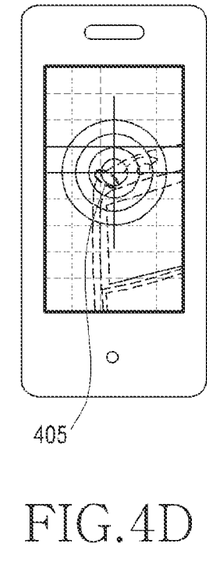

Referring to FIGS. 4B to 4D, the user drives the camera for the visible light communication with the corresponding visible light communication device in FIG. 4B. When the camera is driven, the grid line 401 is automatically generated on the screen. Thereafter, in FIG. 4C, the user searches for the corresponding visible light communication device through the screen for an attempt of the visible light communication. At this time, the target 403 is generated on the screen. The target 403 may be generated automatically or by the user input. In FIG. 4D, the user sets the VLC transmitter/receiver 405 of the corresponding visible light communication device shown on the screen to the target 403, and then the visible light communication is performed.

As shown in FIGS. 4A to 4D, the grid line 401 and the target 403 are generated, thereby helping the user directly adjust the direction of the visible light communication device such that a transmission direction is set toward a desired point. When the visible light communication is started, the grid line 401 and the target 403 disappear automatically or by the user input on the screen. In the visible light communication, differently from the communication using the existing radio frequency (RF), since straightness between the devices is indispensable, the above-described method plays an important role in a process of connecting the visible light communication.

However, when the distance between the visible light communication device and the corresponding visible light communication device increases, it is difficult to check whether or not the visible light signal shown on the screen of the visible light communication device is correctly transmitted to the corresponding visible light communication device. In this case, the color of the visible light signal received through the camera unit of the visible light communication device is calibrated to a color in a visible range such that the user can easily identify the visible light signal. Embodiments regarding this will be described below.

Figure 5A:
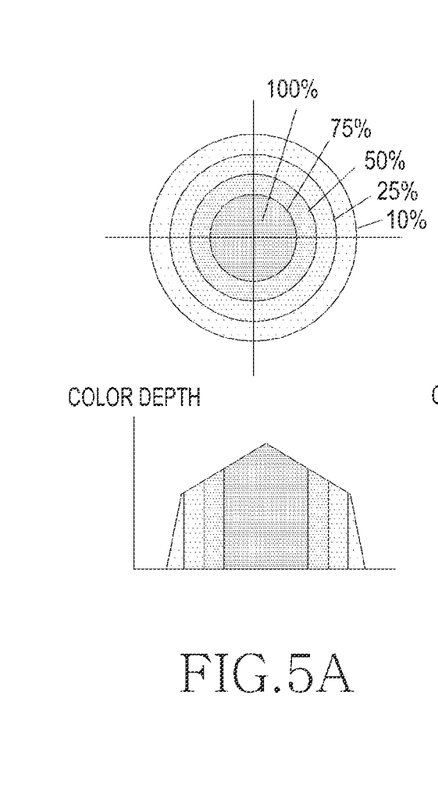
FIGS. 5A to 5C illustrate an example of a color calibration process of a visible light signal according to an embodiment of the present invention.
Figure 5B:
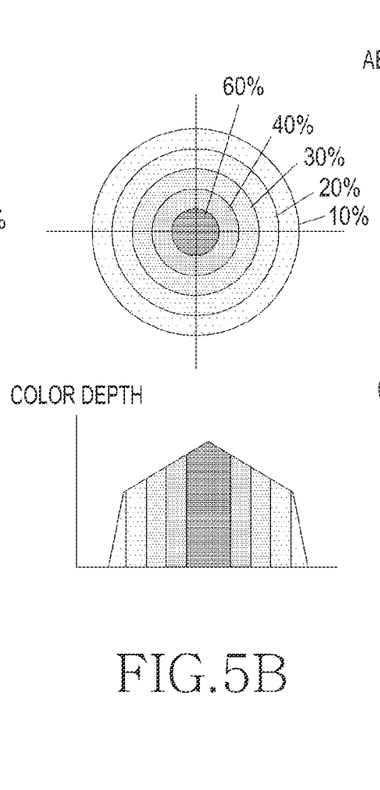
Figure 5C:
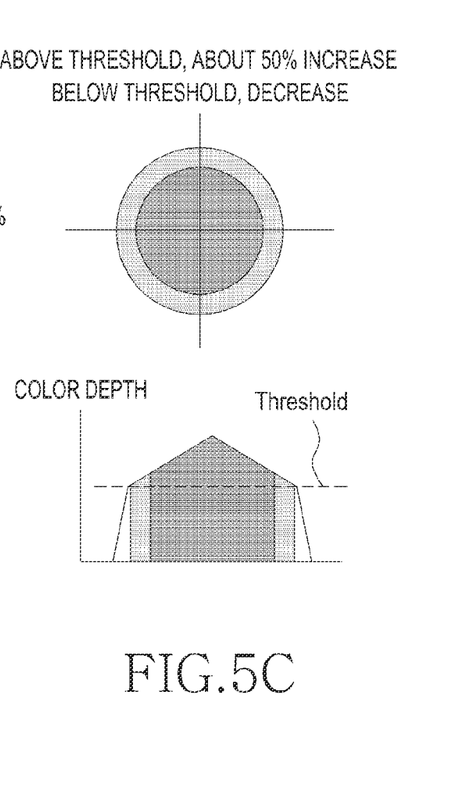

FIGS. 5A to 5C illustrate an example of a color calibration process of a visible light signal according to an embodiment of the present invention. FIG. 5A shows a color of the visible light signal actually generated in the visible light communication device, FIG. 5B shows a color of the visible light signal of the time when the visible light signal arrives at a location where the corresponding communication device is located, in a case where the corresponding communication device performing visible light communication with the visible light communication device is located in a relatively far range, and FIG. 5C shows a color of the time when the color of the visible light signal is calibrated. It is assumed that all the drawings shown in FIG. 5 are shown to the user through the screen.

Referring to FIGS. 5A to 5C, the visible light communication device generates the visible light signal of a specific color to perform visible light communication with the corresponding visible light communication device at the very first as shown in FIG. 5A. The visible light signal of the specific color has a central portion displayed most darkly, and depth of the color grows lighter from the central portion toward an edge of the light visible signal.

However, when the corresponding visible light communication device is located in the far range, the closer the visible light signal progresses to the corresponding visible light communication device, the lighter the color of the visible light signal is. This case is shown in FIG. 5B. It is noted that the depth of the central portion grows lighter by 40% as compared with FIG. 5A. In this case, since the color itself of the visible light signal grows light, it is difficult for the user to determine whether or not the visible light signal is correctly transmitted to the corresponding visible light communication device. To this end, as shown in FIG. 5C, the color of the visible light signal of FIG. 5B which is displayed on the screen grows dark to a depth level higher than or equal to a predetermined threshold value such that the color of the visible light signal which is displayed on the screen grows as dark as the user can distinguish, which makes it possible to determine whether or not the visible light communication device is accurately aligned with the corresponding visible light communication device.

Moreover, as shown in FIG. 5C, not whole colors but only one portion including a central portion of the visible light signal grows dark, and the remaining portions grow very light, so visibility can be further intensified.

Figure 6:
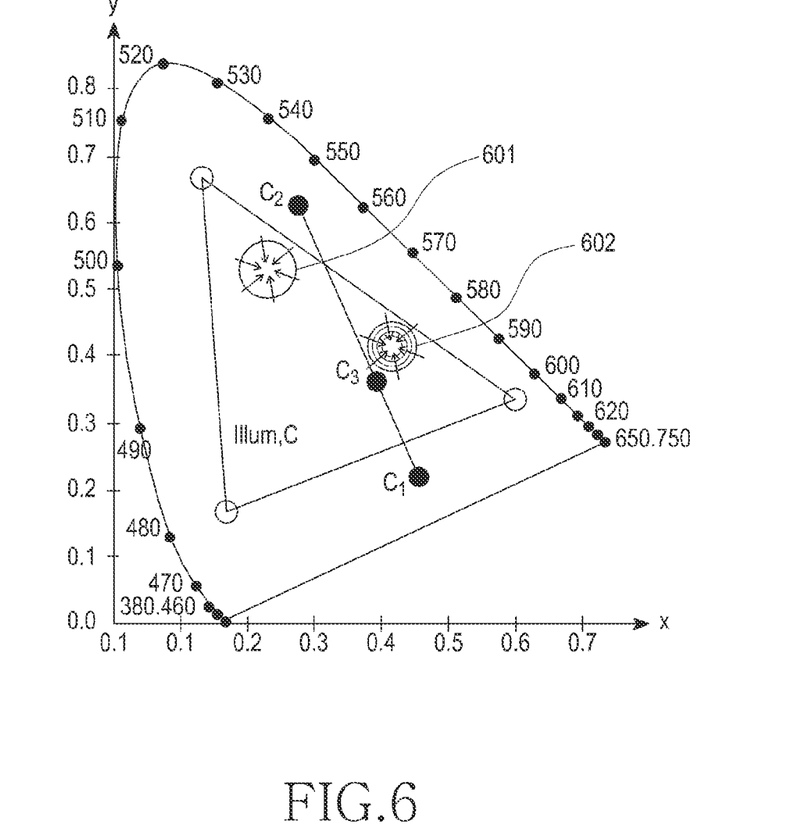
FIG. 6 is a graph showing an example of color calibration of the visible light signal using a chromaticity coordinate system according to an embodiment of the present invention.

FIG. 6 is a graph showing an example of color calibration of the visible light signal using a chromaticity coordinate system according to an embodiment of the present invention.

Referring to FIG. 6, for example, assuming that a color of the visible light signal is a red color, as 602 of FIG. 6, a central portion of the visible light signal may have a relatively dark red color, and a peripheral portion of the visible light signal may have a light red color. In this case, if a predetermined circle is created while the central portion of the visible light signal serves as an origin, and whole portions in the predetermined circle are calibrated to a color identical with that of the central portion, the visible light signal may be more darkly displayed on the screen, and by using the visible light signal, the user can readily determine whether or not the visible light communication device is accurately aligned with the corresponding visible light communication device. This can be identified through the part indicated by reference numeral 601 of FIG. 6. In the part indicated by reference numeral 601, a color of the visible light signal is a green color, a predetermined circle is created while the central portion of the visible light signal serves as an origin, and whole portions in the predetermined circle are calibrated to a color identical with that of the central portion. Due to this calibration, the user can more certainly identify the visible light signal on the screen.

Figure 7:
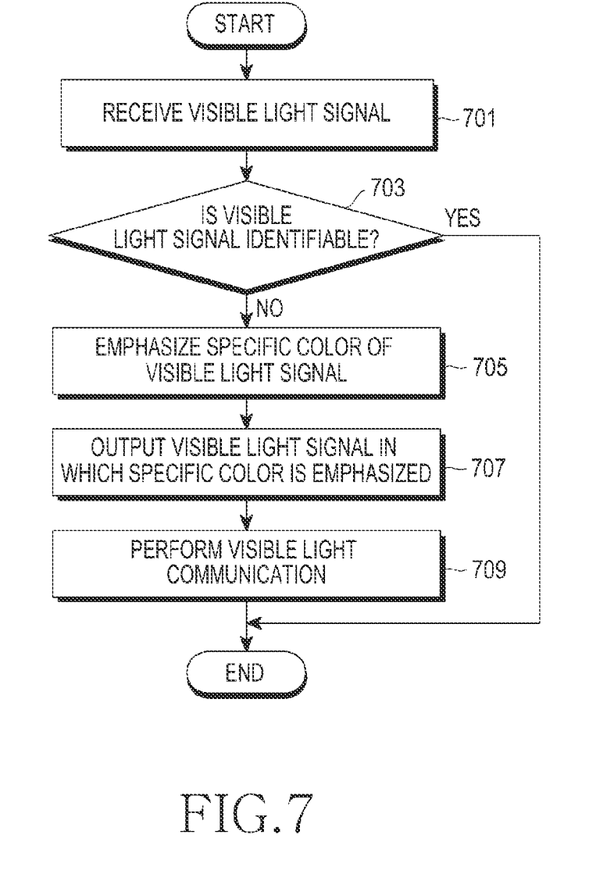
FIG. 7 is a flowchart showing a process of performing alignment between the visible light communication devices according to the embodiment of the present invention.

FIG. 7 is a flowchart showing a process of performing alignment between the visible light communication devices according to the embodiment of the present invention.

Referring to FIG. 7, in step 701, the visible light communication device generates and transmits a visible light signal to a counterpart visible light communication device. The visible light signal has a predetermined color, which may be changed by user settings. In step 703, the visible light communication device determines whether or not the visible light signal displayed on the screen thereof is correctly transmitted toward the corresponding visible light communication device. The visible light signal is displayed on the screen through the camera unit. In the visible light communication, since straightness between the devices is important, it is indispensable that the visible light signal is accurately transmitted toward the corresponding visible light communication device. If the visible light communication device is close to the corresponding visible light communication device such that it can be identified whether or not the visible light signal displayed on the screen is correctly transmitted toward the corresponding visible light communication device, the visible light communication device proceeds to step 709, in which the visible light communication device performs visible light communication.

If the visible light communication device is far from the corresponding visible light communication device such that it is impossible to determine whether or not the visible light signal displayed on the screen is correctly transmitted toward the corresponding visible light communication device, the visible light communication device proceeds to step 705, in which the visible light communication device darkly calibrates the color of the visible light signal currently displayed on the screen. For example, when a green LED is used as a light source, a visible light signal with a green color is generated, and a green color portion of the visible light signal currently displayed on the screen is calibrated to be further emphasized. Thereafter, in step 707, the visible light communication device outputs the visible light signal on the screen again, so that the user can determine whether or not the visible light signal is correctly transmitted toward the corresponding visible light communication device. In step 709, when the visible light signal is correctly aligned with the corresponding visible light communication device, the visible light communication device performs the visible light communication.

Meanwhile, although specific embodiments are described in the above description of the present invention, various modifications may be carried out without departing from the scope of the present invention. Accordingly, the scope of the present invention shall not be determined by the above-described embodiments, and is to be determined by the following claims and their equivalents.

What is claimed is:

1. A method for alignment between visible light communication devices, comprising:
   generating a visible light signal and transmitting the visible light signal to a counterpart device by a device;
   determining whether or not the visible light signal output through a screen of the device is identifiable;
   calibrating a color of the visible light signal output on the screen when the visible light signal is not identifiable; and
   performing alignment for visible light communication with the counterpart device by using the calibrated visible light signal.

2. The method of claim 1, wherein determining whether or not the visible light signal is identifiable comprises:
   receiving an input of an image including the visible light signal by using a camera unit mounted to the device; and
   determining that the visible light signal is not identifiable, when the color of the visible light signal included in the image has a value smaller than a predetermined threshold value.

3. The method of claim 2, wherein when the image is received, the device automatically compares the color of the visible light signal included in the image with the predetermined threshold value, and then determines whether or not the visible light signal is identifiable.

4. The method of claim 1, wherein calibrating the color of the visible light signal comprises more brightly calibrating color brightness of the visible light signal by a predetermined threshold value and outputting the calibrated color on the screen.

5. The method of claim 1, wherein generating the visible light signal and transmitting the visible light signal to the counterpart device comprise:
   generating a grid line and a target on the screen of the device; and
   transmitting the visible light signal to a visible light communication receiver of the counterpart device by using the generated grid line and target.

6. The method of claim 5, wherein the device identifies a transmission image of the visible light signal using the target through a camera unit of the device.

7. An apparatus for aligning visible light communication devices, comprising:
   a camera unit to which an image including a visible light signal is input;
   an input/output unit which outputs the image input from the camera unit on a screen, and to which a user input is input;
   an image processor which calibrates a color of the visible light signal included in the image when the user input is received;
   a visible light communication transmitter/receiver which transmits visible light communication including the visible light signal to a counterpart device, and receives the visible light communication including the visible light signal from the counterpart device; and a controller which determines whether or not the visible light signal included in the image displayed on the screen is identifiable, controls the image processor to calibrate the color of the visible light signal output on the screen when the visible light signal is not identifiable, and performs a control to align the apparatus with the counterpart device for the visible light communication, by using the calibrated visible light signal.

8. The apparatus of claim 7, wherein when color brightness of the visible light signal included in the image has a value lower than a predetermined threshold value, the controller determines that the visible light signal is not identifiable.

9. The apparatus of claim 7, wherein the controller more brightly calibrates color brightness of the visible light signal by a predetermined threshold value.

10. The apparatus of claim 7, wherein the controller performs a control to generate a grid line and a target on the screen, and performs a control to transmit the visible light signal to a visible light communication receiver of the counterpart device, by using the generated grid line and target.

11. The apparatus of claim 7, further comprising:
a storage unit which stores the image input through the camera unit and a variable necessary for calibrating the visible light signal.

12. The apparatus of claim 11, wherein the variable includes a threshold value which is a criterion for calibrating color brightness of the visible light signal.

* * * * *